(12) United States Patent
Miller

(10) Patent No.: US 9,669,602 B2
(45) Date of Patent: Jun. 6, 2017

(54) REACTIVE ROOFING ADHESIVE

(75) Inventor: John William Miller, Hudson, MI (US)

(73) Assignee: ADCO Products, LLC, Michigan Center, MI (US)

(*) Notice: Subject to any disclaimer, the term of this patent is extended or adjusted under 35 U.S.C. 154(b) by 173 days.

(21) Appl. No.: 14/114,074

(22) PCT Filed: May 4, 2012

(86) PCT No.: PCT/US2012/036570
§ 371 (c)(1),
(2), (4) Date: Oct. 25, 2013

(87) PCT Pub. No.: WO2012/151513
PCT Pub. Date: Nov. 8, 2012

(65) Prior Publication Data
US 2014/0044935 A1   Feb. 13, 2014

Related U.S. Application Data

(60) Provisional application No. 61/482,945, filed on May 5, 2011.

(51) Int. Cl.

| | |
|---|---|
| B32B 3/10 | (2006.01) |
| B32B 7/12 | (2006.01) |
| C08G 18/10 | (2006.01) |
| C08G 18/20 | (2006.01) |
| C09J 175/04 | (2006.01) |
| B32B 7/14 | (2006.01) |
| B32B 37/12 | (2006.01) |
| C09J 5/08 | (2006.01) |
| C08G 18/48 | (2006.01) |
| C08G 18/18 | (2006.01) |
| C08L 75/04 | (2006.01) |

(52) U.S. Cl.
CPC .......... *B32B 7/12* (2013.01); *B32B 7/14* (2013.01); *B32B 37/12* (2013.01); *C08G 18/10* (2013.01); *C08G 18/1808* (2013.01); *C08G 18/1816* (2013.01); *C08G 18/1833* (2013.01); *C08G 18/1875* (2013.01); *C08G 18/2018* (2013.01); *C08G 18/2027* (2013.01); *C08G 18/2063* (2013.01); *C08G 18/4825* (2013.01); *C08L 75/04* (2013.01); *C09J 5/08* (2013.01); *C09J 175/04* (2013.01); *Y10T 428/24826* (2015.01); *Y10T 428/24851* (2015.01); *Y10T 428/31587* (2015.04)

(58) Field of Classification Search
CPC .............................. Y10T 428/24826
See application file for complete search history.

(56) References Cited

U.S. PATENT DOCUMENTS

| 4,769,401 A | 9/1988 | Webber et al. |
|---|---|---|
| 4,869,044 A | 9/1989 | Wald |
| 5,051,474 A | 9/1991 | Warren et al. |
| 5,064,871 A | 11/1991 | Sciangola |
| 5,175,228 A | 12/1992 | Wang et al. |
| 5,872,203 A * | 2/1999 | Wen ............... C08G 18/698 428/423.1 |
| 6,103,850 A | 8/2000 | Reichel et al. |
| 6,220,526 B1 | 4/2001 | Johnson |
| 6,418,687 B1 | 7/2002 | Cox |
| 6,679,018 B2 | 1/2004 | Georgeau et al. |
| 6,742,313 B2 | 6/2004 | Ritland et al. |
| 6,938,386 B2 | 9/2005 | Ritland et al. |
| 2003/0195287 A1* | 10/2003 | Fisher ............... C08L 23/04 524/492 |
| 2004/0180195 A1* | 9/2004 | Macuga ............... B32B 7/12 428/343 |
| 2005/0246991 A1 | 11/2005 | Chen et al. |
| 2006/0078741 A1 | 4/2006 | Ramalingam, Jr. |
| 2006/0189736 A1 | 8/2006 | Mori et al. |
| 2007/0055038 A1 | 3/2007 | Gimmnich et al. |
| 2007/0197675 A1 | 8/2007 | Matsumoto |
| 2007/0270567 A1 | 11/2007 | Suen |
| 2008/0038548 A1* | 2/2008 | Clarke ............... E04D 5/148 428/343 |
| 2008/0281013 A1 | 11/2008 | Nakamura et al. |
| 2010/0193961 A1 | 8/2010 | Konishi et al. |
| 2010/0288431 A1 | 11/2010 | Bossaert et al. |
| 2011/0068306 A1 | 3/2011 | Liao et al. |
| 2011/0108183 A1 | 5/2011 | Golombowski |

OTHER PUBLICATIONS

Non-final office action of U.S. Appl. No. 14/069,653 notification date of Oct. 9, 2015, pp. 1-13.
Non-final office action of U.S. Appl. No. 14/069,653 notification date of May 20, 2015, pp. 1-14.

* cited by examiner

*Primary Examiner* — Christopher Polley
(74) *Attorney, Agent, or Firm* — Benesch, Friedlander, Coplan & Aronoff LLP

(57) ABSTRACT

A two-part adhesive includes an A side, a B side, at least one of a polyurethane prepolymer and a diisocyanate, a polyol, a catalyst, and an adhesion promoter. The polyurethane prepolymer or diisocyanate is present in the A side from about 50% to 100% by weight of the A side composition. The polyol is present in the B side from about 52% to about 98% by weight of the B side composition. The catalyst is present in the B side from about 0.5% to about 5% by weight of the B side composition. The adhesion promoter is present in at least one of the A side composition and the B side composition from about 10% to about 50% by weight of the two-part adhesive. A ratio of isocyanate groups in the A side to hydroxyl groups in the B side is greater than 1.5:1.

10 Claims, No Drawings

REACTIVE ROOFING ADHESIVE

CROSS-REFERENCE TO RELATED APPLICATIONS

This application claims priority to International Application No. PCT/US12/36570, filed on May 4, 2012, which claims the benefit of U.S. Provisional Application No. 61/482,945 filed on May 5, 2011. The disclosure of the above application is incorporated herein by reference.

FIELD

The present invention relates to one-part and two-part adhesives with low volatile organic content for use with untreated roofing membranes, roofing substrates, and insulation boards.

BACKGROUND

In many roofing applications, for example in large, flat commercial roof decks, the roofing substrate is a concrete, light weight concrete, wood, gypsum, wood fiber or steel roof deck. The roofing membrane is used to seal and protect the roof deck from environmental weather conditions and is placed over insulation boards, which provide insulative qualities. The insulation boards are typically secured to the roofing substrate or roof deck via an adhesive composition or fasteners. The roofing membrane may be made of various materials, such as polymeric materials including EPDM (ethylene propylene diene M-rubber), Mod Bit (Modified Bitumen), TPO (thermoplastic polyolefin), or polyvinyl chloride (PVC). The roofing membrane may also be a composite material that includes EPDM or TPO. The roofing membrane is adhered overtop insulation boards or panels using an adhesive composition such as mopping asphalt (typically Type III or Type IV) or other conventional adhesive compositions. Conventional adhesives normally are required to be applied to both the roofing membrane and the substrate.

A conventional adhesive composition used to adhere the roofing membrane to the roof deck or other substrate includes the use of a solvent based elastomer, such as, for example, a polychloroprene rubber in an acetone or toluene solvent. However, typical polychloroprene rubber adhesives are solvent based and contain high (>250 g/L) levels of volatile organic compounds (VOC). These adhesives cannot be sold in areas where federal, state or local regulations prohibit the use of such high VOC adhesives. Other solvent based adhesives use VOC exempt solvents like acetone, t-butyl acetate and para-chlorobenzotrifluoride which will work in their intended applications, but they are slow to evaporate at cold temperatures or have very low flash point. Other adhesives are based on waterborne emulsions of polychloroprene rubber However, while useful for their intended purpose, these water based adhesives may have issues regarding temperature restrictions, long curing times, odor concerns and freeze-thaw stability. In addition, these adhesives are contact adhesives that require full coverage between the substrate and the membrane. Accordingly, solvent and water based elastomer adhesives must be applied to both the substrate and the roofing membrane and cover substantially the entire surfaces of the adhering components. These adhesives can blister when used between two non-breathable surfaces due to the incomplete evaporation of solvent or water from the above adhesives. For example, blistering may occur on a new roof membrane when applied over an existing roof membrane in recover applications.

Traditional one-part polyurethane adhesives, such as in U.S. Pat. No. 6,679,018 issued to Georgeau, are limited by their need for ambient moisture to cure. Therefore these moisture cure adhesives have limited utility in low humidity environments or when used in between two moisture impermeable membranes, for example, between a new roof membrane and an existing roof membrane in recover applications.

Traditional two-part membrane adhesives, such as U.S. Pat. No. 7,622,187 issued to Clarke and U.S. Pat. Nos. 6,938,386 and 6,742,313 issued to Ritland, require a modified membrane surface to attach the membrane to a roofing substrate. For example, the surface modified membrane is typically an EPDM or TPO incorporating a "fleece" backing.

Other polyurethane adhesive compositions, such as the adhesive composition disclosed in U.S. Pat. No. 5,872,203 issued to Wen et al., utilize compositions limited to a ratio of isocyanate groups to hydroxyl groups of less than 1.5:1. Additionally, Wen discloses the use of organosilanes as adhesion promoters. Organosilanes are known to improve initial adhesion, but have no effect on heat aging properties.

Accordingly, there is room in the art for adhesive compositions in roofing applications that exhibit favorable properties, such as sufficient adhesive strength, shelf life, cure time, tack, that are easily applied, that have low VOC content and are 100% solids with essentially no volatility.

SUMMARY

A two-part adhesive includes an A side, a B side, at least one of a polyurethane prepolymer and a diisocyanate, at least one polyol, at least one catalyst, and at least one adhesion promoter. The at least one of a polyurethane prepolymer and a diisocyanate is present in the A side in an amount from about 50% to 100% by weight of the A side composition. The at least one polyol is present in the B side in an amount from about 52% to about 98% by weight of the B side composition. The at least one catalyst is present in the B side in an amount from about 0.5% to about 5% by weight of the B side composition. The at least one adhesion promoter is present in at least one of the A side composition and the B side composition in an amount from about 10% to about 50% by weight of the two-part adhesive. A ratio of isocyanate groups in the A side to hydroxyl groups in the B side is greater than 1.5:1.

In another aspect, the two-part adhesive exhibits a wind up-lift rating of greater than 50 psf.

In yet another aspect, the two-part adhesive exhibits a wind up-lift rating of greater than 90 psf.

In yet another aspect, the two-part adhesive passes a standard negative pressure test.

In yet another aspect, the at least one of a polyurethane prepolymer and a diisocyanate is a prepolymer.

In yet another aspect, the at least one polyol includes at least one of a multifunctional polyether polyol and a polyester polyol.

In yet another aspect, the at least one polyol includes at least one of a polyether diol and a polyester diol.

In yet another aspect, the at least one catalyst is a diazole.

In yet another aspect, the at least one catalyst is an imidazole.

In yet another aspect, the at least one catalyst is a 1-methylimidazole.

In yet another aspect, the at least one catalyst is 2,2-dimorphorlinodiethylether.

In yet another aspect, the at least one catalyst is a quaternary ammonium salt.

In yet another aspect, the at least one adhesion promoter is selected from the group consisting of chlorinated paraffins and chlorinated polyolefins.

In yet another aspect, the at least one adhesion promoter includes at least two adhesion promoters each selected from the group consisting of chlorinated paraffins and chlorinated polyolefins.

In yet another aspect, the adhesive further includes a blowing agent present in the B side.

In yet another aspect, the adhesive further includes a blowing agent present in an amount from about 0.25% to about 1% of the B side.

In yet another aspect, the adhesive further includes a blowing agent present in an amount from about 0.25% to about 3% of the B side.

In yet another aspect, the two-part adhesive has a heat aged T-peel breakaway strength to untreated EPDM of greater than 0.5 pli.

In yet another aspect, the B side composition and the A side composition are pumpable.

In yet another aspect, the B side composition and the A side composition are sprayable.

In yet another aspect, the two-part adhesive is soft with a modulus of less than 500 psi and is tacky with a T-peel breakaway strength of greater than 0.5 pli.

In yet another aspect, the at least one polyol is present in an amount from about 93% to about 97% by weight of the B side composition, the at least one of a polyurethane prepolymer and a diisocyanate is present in an amount from about 70% to about 90% by weight of the A side composition, and the at least one adhesion promoter is present in an amount from about 10% to about 30% by weight of the A side composition.

In yet another aspect, the two-part adhesive composition has a balance of cure speed, adhesion strength, and tack.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

A roofing membrane is used to seal and protect the roof deck from environmental weather conditions and is placed over insulation boards that insulate the roof deck. The roof deck may take various forms including, for example, a concrete, light weight concrete, wood, gypsum, wood fiber or steel roof deck. The insulation boards may be in various configurations such as sheets and be made of various materials without departing from the scope of the present invention. The roofing membrane may be made of various materials, such as polymeric materials including EPDM (ethylene propylene diene M-rubber), TPO (thermoplastic polyolefin), polyvinyl chloride (PVC), ketone ethylene ester (KEE), or Mod Bit (Modified Bitumens). The roofing membrane may be a composite material that includes EPDM or TPO or other suitable membranes. An adhesive composition according to the principles of the present invention is provided for securing a first component, such as the above-described roofing membrane or insulation boards, to a second component or roofing substrate, such as a roof deck or existing roofing membrane. For example, in one embodiment, the adhesive composition adheres a new roofing membrane to an existing worn roofing membrane or surface. The existing roofing membrane may be cleaned with a pressure washer or broomed, swept or blown free of dirt and debris and the adhesive directly applied. Additionally, the cleaned roof can be primed with known commercial roofing primers prior to applying the adhesive. Alternatively, any combination of the above methods may be used.

The adhesive composition is either a one-part or a two-part reactive adhesive composition. The adhesive composition generally includes a polyol, a pre-polymer, a catalyst, and an adhesion promoter.

The polyol may be any compound conventionally used in the production of polyurethanes having at least one isocyanate-reactive functionality. These polyols include glycols or diols. One exemplary polyol suitable with the composition of the present invention includes an ortho phthalate-diethylene glycol based aromatic polyester polyol commercially available from Stepan under the designation STEPANPOL PS-2352. Another exemplary polyol suitable with the composition of the present invention includes a di-functional polyether diol commercially available from Huntsman under the designations JEFFOL PPG-1000 and JEFFOL PPG-2000. Another exemplary polyol suitable with the present invention includes a multi-functional polyether polyol commercially available from BASF under the designation PLURACOL SG360. Chemical derivatives and combinations of polyols may also be employed in the composition without departing from the scope of the present invention. The polyol comprises from about 30% to about 50% by weight of the composition.

The prepolymer or polymer precursor may be any polyurethane prepolymer formed by combining an excess of diisocyanate with a polyol to yield a diisocyanate prepolymer. The prepolymer reacts like a diisocyanate but with several important differences. When compared with the original diisocyanate, the prepolymer has a greater molecular weight, a higher viscosity, a lower isocyanate content by weight (% NCO), and a lower vapor pressure. One exemplary prepolymer suitable with the composition of the present invention includes a moisture cure prepolymer commercially available from Huntsman under the designation RUBINATE 9272. Another exemplary prepolymer suitable with the composition of the present invention includes a 4,4'-MDI prepolymer commercially available from Huntsman under the designation RUBINATE 1209. Combinations of prepolymers and commercially available prepolymers or modified prepolymers may also be employed in the composition without departing from the scope of the present invention. In one embodiment, the prepolymer comprises from about 30% to about 70% by weight of the composition.

The catalyst may be a metal or an amine based urethane catalyst. It is preferably amine based, more preferably a diazole, and even more preferably an imidazole. One exemplary catalyst suitable with the composition of the present invention includes 1-methylimidazole, commercially available from Air Products and Chemicals, Inc. under the designation IMICURE AMI-1. A secondary catalyst can also be used. An example includes a quaternary ammonium salt, DABCO TMR-3, commercially available from Air Products and Chemicals. Combinations of catalysts may also be employed in the composition without departing from the scope of the present invention. The catalyst comprises from about 0.5% to about 5% by weight of the composition.

The blowing agent may be reactive or non-reactive. Non-reactive blowing agents include hydrocarbons and hydrofluorocarbons. Reactive blowing agents react with the isocyanate group which produces carbon dioxide. The carbon dioxide generation produces cellular structure within the adhesive. The application of the membrane will crush the adhesive thereby releasing the generated carbon dioxide. Water is a commonly used reactive blowing agent in two-part polyurethanes. When water is included in the B side of a two-part polyurethane, the water reacts with the A side components upon mixing of the A and B sides. Additionally, water is not considered a VOC or solvent.

The adhesive composition may include adhesion promoters such as chlorinated waxes, chlorinated paraffins or chlorinated polyolefins. An example is Paroil 60H, commercially available from Dover Chemicals.

The adhesive composition may further include other additives, such as, for example, tackifiers, fillers, plasticizers, surfactants, rheology modifiers, and thixotropic agents. Fillers, plasticizers, rheology modifiers, surfactants, and thixotropic agents may be used to alter the liquid viscosity to either or both of parts A and B, optimize mixing properties during dispensing, enhance air entrainment, improve wet out, and improve flow properties of the adhesive during application. Examples of fillers include silica particles and talc. Examples of plasticizers include process oils and phthalates. Examples of rheology modifiers include organoclays, natural clays, and fumed silica. An exemplary organoclay is CLAYTONE APA available from Southern Clay Products. The surfactants may include silicone based or non-silicone based compounds. Tackifiers may be added to improve initial green strength and may be selected, for example, from a group including polyterpenes, rosin esters, phenolic resins, hydrocarbon resins, and hydrogenated resins.

The amount of the components included in the composition is selected to balance tack, cure speed, and adhesion strength of the adhesive. For example, the embodiments presented exhibit adhesive tack upon curing and the foam adhesive is substantially soft with a low modulus. The low modulus allows for diffusion of the adhesion promoter to the substrate surface and improves aged adhesive strength.

The "A" side and "B" side are mixed so that the ratio of the reactive components, ie, ratio of "A" side isocyanate groups to "B" side hydroxyl groups, is greater than 1.5:1. This ratio is also known as the Isocyanate index and stoichiometrically one isocyanate group reacts with one hydroxyl group. In several of the examples presented below, this Isocyanate index and the prepolymer incorporated combine to produce a soft, non-rigid adhesive.

The adhesive composition is prepared by mixing the components prior to application on a substrate. In a one-part adhesive configuration, the components are mixed prior to packaging into a single container. The adhesive is then dispensed or otherwise applied to the roofing substrate or the roofing membrane and is cured in-situ via moisture cure. Due to the reactive nature of the adhesive composition, the adhesive composition may be applied in ribbon or bead method and may be applied to only one side of the substrate or roofing membrane. Additionally, the adhesive compositions provided herein are sprayable. In some of the adhesive composition examples described below the sprayability of the adhesive composition is facilitated using equipment that is capable of modifying the viscosity of the adhesive through the application of heat or like methods.

In a two-part adhesive configuration, the adhesive is formed by combining two separate compositions or blends just prior to application on the roofing substrate. The two parts include a "B side" or resin side and an "A side" or prepolymer side. Each of the sides is packaged separately and is mixed by an applicator prior to applying on the roofing substrate. The A and B side components may be packaged in several ways. For example, each may be stored in a collapsible bag disposed within a box such as Cubitainer® by Hedwin or Cheertainer® by CDF, stored in rigid containers such as drums or barrels, paired in cylinders, or in flexible, fully compressible structures such as collapsible tubes that dispense the materials. In the example provided, the B side includes the polyol and the catalyst and the A side includes the prepolymer. The adhesive, once mixed, is dispensed or otherwise applied to the roofing substrate or the roofing membrane. During mixing, and after mixing, the components react to form a polyurethane adhesive having suitable physical properties. Due to the reactive nature of the adhesive composition, the adhesive composition may be applied in ribbon or bead method and may be applied to only one side of the substrate or roofing membrane. As noted above, the A Side and B Side components are preferably mixed by an applicator just prior to being dispensed or otherwise applied to the roofing substrate. For example, the polyurethane adhesive composition is applied as discrete beads or ribbons. Space is left between adhesion points, thereby allowing any entrapped volatiles to escape through the system. For example, trapped water, such as rain drops on an existing roof surface, which is recovered with a new waterproofing membrane, may become an entrapped volatile. Forms of application include using a cartridge, using low pressure pumping of the two components and mixing them with a static mixer, or using high pressure tanks that are brought to about 500-1500 psi with an inert dry gas, such as Nitrogen. In the latter form of application, the A and B side materials are metered as two individual components and brought together and mixed by high pressure impingement or by a static mixer and then applied in a bead or ribbon form.

In addition, a multi bead applicator system in which individual components are brought together under ambient conditions and are mixed generally through a static mixer may be employed. The multi bead applicator system may include individual two-component cylinders or the two components may be brought together under various pumping methodologies and mixed through a static mixer. The "A" and "B" side components are generally mixed in a ratio of 1:1 by volume, however the ratio may range from about 10:1 to about 1:10. During mixing, and after mixing, the A Side components and B Side components react to form a polyurethane adhesive having suitable physical properties. Preferably, the adhesive composition is applied in discrete beads or ribbons overtop the roofing substrate, such as the insulation boards or roof deck or roofing membrane. Next, the roofing membrane is rolled or otherwise positioned overtop of the adhesive composition and the roofing substrate. The adhesive composition then cures and secures the roofing membrane to the roofing substrate. Due to the formulation of the adhesive composition of the present invention, the roofing substrate and the roofing membrane may be untreated, i.e., no primer or membrane fleece back is required to achieve the desired adhesive strength. Therefore, no fleece backing or primer needs to be applied during membrane production in the factory or during membrane installation at the job site. The multi-bead applicator may also be used to apply the adhesive composition in a one-part configuration.

In order that the invention may be more readily understood, reference is made to the following examples which are intended to illustrate various embodiments of the adhesive composition of the present invention, but not limit the scope thereof:

Example 1

One-Part Adhesive

| Material | Exemplary Trade Name | Percent by Weight |
|---|---|---|
| Polyol | STEPANPOL 2352 | 25-35% |
| Moisture cure prepolymer | RUBINATE 9272 | 60-70% |
| Catalyst | 2,2-dimorphorlinodiethylether | 1.0-5.0% |

Example 2

Two-Part Adhesive

| Material | Exemplary Trade Name | Percent by Weight of total | of side |
|---|---|---|---|
| "B" or Resin Side | | | |
| Polyol | JEFFOL PPG-2000 | 45-55% | 92-98% |
| Curing Agent | IMICURE AMI-1 | 2.0-3.0% | 0.5-5.0% |
| "A" or Prepolymer Side | | | |
| Prepolymer | RUBINATE 1209 | 45-55% | 92-98% |
| Catalyst | 2,2-dimorphorlinodiethylether | 1.0-5.0% | 0.5-5.0% |

Example 3

Two-Part Adhesive

| Material | Exemplary Trade Name | Percent by Weight of total | of side |
|---|---|---|---|
| "B" or Resin Side | | | |
| Polyol | JEFFOL PPG-2000 | 30-40% | 92-98% |
| Curing Agent | IMICURE AMI-1 | 2.0-3.0% | 0.5-5.0% |
| "A" or Prepolymer Side | | | |
| Prepolymer | RUBINATE 9272 | 60-70% | 92-98% |
| Catalyst | JEFFCAT DMDEE | 1.0-5.0% | 0.5-5.0% |

Example 4

Two-Part Adhesive

| Material | Exemplary Trade Name | Percent by Weight | |
|---|---|---|---|
| "B" or Resin Side | | | |
| Polyol | JEFFOL PPG-1000 | 45-55% | 92-98% |
| Curing Agent | IMICURE AMI-1 | 2.0-3.0% | 0.5-5.0% |
| "A" or Prepolymer Side | | | |
| Prepolymer | RUBINATE 1209 | 45-55% | 92-98% |
| Catalyst | JEFFCAT DMDEE | 1.0-5.0% | 0.5-5.0% |

Example 5

Two-Part Adhesive

| Material | Exemplary Trade Name | Percent by Weight | |
|---|---|---|---|
| "B" or Resin Side | | | |
| Polyol | JEFFOL PPG-1000 | 45-55% | 92-98% |
| Catalyst | IMICURE AMI-1 | 1.0-3.0% | 0.5-5.0% |
| "A" or Prepolymer Side | | | |
| Prepolymer | RUBINATE 9272 | 45-55% | 92-98% |
| Catalyst | JEFFCAT DMDEE | 1.0-5.0% | 0.5-5.0% |

Examples 6, 7, and 8

Two-Part Adhesives

| Components | Trade Name | 6 Wt % | 7 Wt % | 8 Wt % |
|---|---|---|---|---|
| "B" or Resin Side | | | | |
| Polyol | JEFFOL PPG-2801 | 95.20 | 94.45 | 94.45 |
| Catalyst | IMICURE AMI-1 | 4.80 | 4.80 | 4.80 |
| | DABCO TMR-3 | | 0.50 | 0.50 |
| Blowing Agent | Water | | 0.25 | 0.25 |
| "A" or Prepolymer Side | | | | |
| Prepolymer | RUBINATE 9404 | 100.0 | | |
| | RUBINATE 9040 | | 100.0 | |
| | RUBINATE 9009 | | | 70.0 |
| Additive | PAROIL 140LV | | | 30.0 |

Examples 9, 10, and 11

Two-Part Adhesives

| Components | Trade Name | 9 Wt % | 10 Wt % | 11 Wt % |
|---|---|---|---|---|
| "B" or Resin Side | | | | |
| Polyol | JEFFOL PPG-2801 | 96.75 | 96.75 | 96.75 |
| Catalyst | POLYCAT 8 | 3.00 | | |
| | DABCO 33LV | | 3.00 | |
| | POLYCAT 5 | | | 3.00 |
| Blowing Agent | Water | 0.25 | 0.25 | 0.25 |
| "A" or Prepolymer Side | | | | |
| Prepolymer | RUBINATE 9272 | 70.00 | 70.00 | 70.00 |
| Additive | PAROIL 10 | 30.00 | | 15.00 |
| | PAROIL 8707 | | 30.00 | 15.00 |

Examples 12, 13, and 14

Two-Part Adhesives

| Components | Trade Name | 12 Wt % | 13 Wt % | 14 Wt % |
|---|---|---|---|---|
| "B" or Resin Side | | | | |
| Polyol | JEFFOL PPG-2801 | 96.75 | 96.75 | 96.75 |
| Catalyst | POLYCAT 5 | 3.00 | 3.00 | 3.00 |
| Blowing Agent | Water | 0.25 | 0.25 | 0.25 |
| "A" or Prepolymer Side | | | | |
| Prepolymer | RUBINATE 9272 | 70.00 | 70.00 | 70.00 |
| Additive | PAROIL 140 | 30.00 | | |
| | PAROIL 142LV | | 30.00 | |
| | PAROIL 45 | | | 30.00 |

Examples 15, 16, and 17

Two-Part Adhesives

| Components | Trade Name | 15 Wt % | 16 Wt % | 17 Wt % |
|---|---|---|---|---|
| "B" or Resin Side | | | | |
| Polyol | JEFFOL PPG-2801 | 96.75 | 96.75 | 96.75 |
| Catalyst | POLYCAT 5 | 3.00 | 3.00 | 3.00 |
| Blowing Agent | Water | 0.25 | 0.25 | 0.25 |
| "A" or Prepolymer Side | | | | |
| Prepolymer | RUBINATE 9272 | 70.00 | 70.00 | 70.00 |
| Additive | PAROIL 1045 | 30.00 | | |
| | PAROIL 42 | | 30.00 | |
| | PAROIL 54NR | | | 30.00 |

Examples 18, 19, and 20

Two-Part Adhesives

| Components | Trade Name | 18 Wt % | 19 Wt % | 20 Wt % |
|---|---|---|---|---|
| "B" or Resin Side | | | | |
| Polyol | JEFFOL PPG-2801 | 96.75 | 96.75 | 96.75 |
| Catalyst | POLYCAT 5 | 3.00 | 3.00 | 3.00 |
| Blowing Agent | Water | 0.25 | 0.25 | 0.25 |
| "A" or Prepolymer Side | | | | |
| Prepolymer | RUBINATE 9272 | 70.00 | 70.00 | 70.00 |
| Additive | PAROIL 140LV | 30.00 | | |
| | PAROIL 50 | | 30.00 | |
| | PAROIL 145 | | | 30.00 |

Examples 21, 22, and 23

Two-Part Adhesives

| Components | Trade Name | 21 Wt % | 22 Wt % | 23 Wt % |
|---|---|---|---|---|
| "B" or Resin Side | | | | |
| Polyol | JEFFOL PPG-2801 | 96.75 | 96.75 | 96.75 |
| Catalyst | POLYCAT 5 | 3.00 | 3.00 | 3.00 |
| Blowing Agent | Water | 0.25 | 0.25 | 0.25 |
| "A" or Prepolymer Side | | | | |
| Prepolymer | RUBINATE 9272 | 70.00 | 70.00 | 70.00 |
| Additive | PAROIL 53NR | 30.00 | | |
| | PAROIL 40 | | 30.00 | |
| | PAROIL 10 | | | 30.00 |

Each of examples 2-23 are mixed in a 1:1 ratio. Alternative weight percentages and mixing ratios may be incorporated without departing from the scope of the present invention. Additionally, it should be appreciated that the exemplary trade name materials referenced are for illustration purposes only, and that suitable equivalent manufacturers may be employed. In addition, composition may include other additives without departing from the scope of the present invention.

The following table includes test data for Examples 6-23 after the adhesive formulations are applied between two 45 mil RUBBERGARD EPDM membrane strips available from Firestone. The breakaway strength is determined on an Instron machine using a "T" peel testing setup as defined by ASTM D1876.

| Sample | Breakaway Strength - aged 24 h @ 75 F. (in pli) | Breakaway Strength - aged 24 h @ 158 F. (in pli) | Breakaway Strength - aged 24 h @ 212 F. (in pli) |
|---|---|---|---|
| Example 6 | 2.32 | 3.26 | 5.03 |
| Example 7 | 1.32 | 1.94 | 3.81 |
| Example 8 | 0.9 | 1.22 | 1.3 |
| Example 9 | 0.87 | 1.19 | 1.24 |
| Example 10 | 1.57 | 1.42 | 1.76 |
| Example 11 | 1.87 | 1.49 | 1.75 |
| Example 12 | 1.14 | — | 1.79 |
| Example 13 | 0.67 | — | 1.11 |
| Example 14 | 0.96 | — | 1.29 |
| Example 15 | 1.36 | — | 1.65 |
| Example 16 | 1.74 | — | 2.16 |
| Example 17 | 1.17 | — | 1.98 |
| Example 18 | 1.23 | — | 1.05 |
| Example 19 | 1.3 | — | 2.05 |
| Example 20 | 1.11 | — | 1.16 |
| Example 21 | 1.67 | — | 1.58 |
| Example 22 | 0.8 | — | 0.95 |
| Example 23 | 1.11 | — | 1.54 |

Example 6 exhibited a 135 psf wind uplift rating and Example 7 exhibited a 120 psf wind uplift rating when tested using the Factory Mutual 4470 test method. Specifically, the adhesive formulations were applied as part of an installed single-ply roofing system on a wind uplift resistance table. Within the system, the adhesives adhered 45 mil Firestone RUBBERGARD EPDM membrane onto 0.5 inch Firestone ISO Gard HD Coverboard, which was adhered to Firestone 1½ ISO 95+GL Polyisocyanurate Insulation Board with Firestone I.S.O. Twin Pack Insulation Adhesive.

Alternatively, the examples given above may also be tested under negative pressure uplift conditions according to a Factory Mutual 1-52 test method.

The examples given above each have a low modulus of elasticity. For example, the provided example 7 has a modulus of 121.5 psi. Similarly, the remaining examples also have soft and flexible characteristics that promote mobility of the chlorinated paraffins within the adhesive.

A method of adhering a "neat" EPDM roofing membrane to a roof member will now be described. A "neat" EPDM roofing membrane is defined in the present specification to mean a non-fleeced, non-primed, non-surface treated EPDM membrane. In alternative embodiments, other neat water impervious roofing membranes are incorporated. In a first step, at least one adhesive container is provided. In the example provided, the adhesive is the two-part adhesive described in the examples above. The A and B side components or pre-mixed one-part adhesive may be packaged in several ways and in several types of containers. The adhesive may be stored in a collapsible bag disposed within a box, stored in Twin Pack Cartridges, stored in rigid containers such as drums or barrels, paired in cylinders, or in flexible, fully compressible structures such as collapsible tubes that dispense the materials. For example, the adhesive may be stored in a CUBITAINER package available from the Hedwin Corporation of Baltimore, Md.

In a second step the at least one adhesive container is connected to an adhesive applicator device. In the example provided, the adhesive applicator device is the adhesive applicator described in commonly owned U.S. Pat. No. 7,056,556 issued Jun. 6, 2006, which is hereby incorporated by reference as to the technical disclosure of the adhesive applicator. In alternative embodiments, other adhesive applicator devices may be used, such as multi-bead applicators, battery powered applicators, spray wand applicators, spray rig applicators, pressurized canister applicators, low-pressure pump applicators, and other compatible adhesive applicator devices.

In a third step the adhesive is applied to at least one of the EPDM membrane and the roof member with the adhesive applicator device. In the example provided, the roof member is an aged, existing EPDM membrane on a previously assembled roof. The aged, existing EPDM membrane is preferably pressure washed, but not treated or primed. In alternative embodiments, the roof member is a treated or primed EPDM membrane, a smooth surface modified bitumen including SBS and AAP modified bitumens, a smooth surface built-up roof, a concrete roof deck, a wood roof deck, a gypsum roof deck, a polyisocyanurate, XPS, EPS, fiberglass, rockwool, or other insulation member, an isocyanate, gypsum, or other rigid cover board, a steel roof decking, or a TECTUM roof deck member available from Tectum Inc. of Newark, Ohio. It should be appreciated that other roof members may be incorporated without departing from the scope of the present invention.

Furthermore, the adhesive may be applied using various procedures. In the example provided, the A side and B side of a two-part adhesive is first mixed by the adhesive applicator device and then dispensed or otherwise applied to the neat EPDM or the roof member. During and after mixing, the components react to form a polyurethane adhesive having suitable physical properties. Due to the reactive nature of the adhesive composition, the adhesive composition may be applied in ribbon or bead method and may be applied to only one side of the substrate or roofing membrane. It should be appreciated that no mixing is performed during application when a one-part adhesive is used.

In the example provided, the adhesive is pumped in discrete strips, beads, or ribbons onto the roof member. The neat EPDM member is then "broomed" in by applying pressure to the neat EPDM using a broom or similar device to press the EPDM into the adhesive and reduce wrinkles in the installed neat EPDM. In various alternative embodiments, the adhesive is ribbon applied to the neat EPDM, applied in full coverage to the roof member, applied in full coverage to the neat EPDM, ribbon applied to one of the neat EPDM and the roof member and then spread into full coverage, or applied to both the neat EPDM and the roof member in any combination of ribbon application and full coverage application. Additionally, the neat EPDM may be rolled onto the roof member, broomed onto the roof member, "flopped" onto the roof member, or brought into contact with the roof member in various other ways without departing from the scope of the present invention.

It should be appreciated that various types of adhesive applicator devices may be used with various adhesive application methods. For example, forms of application include using a cartridge, using low pressure pumping of the two components and mixing them with a static mixer, or using high pressure tanks that are brought to about 500-1500 psi with an inert dry gas, such as Nitrogen. In the latter form of application, the A and B side materials are metered as two individual components and brought together and mixed by high pressure impingement or by a static mixer and then applied in a bead or ribbon form.

In addition, a multi bead applicator system in which individual components are brought together under ambient conditions and are mixed generally through a static mixer may be employed. The multi bead applicator system may include individual two-component cylinders or the two components may be brought together under various pumping methodologies and mixed through a static mixer. The "A" and "B" side components are generally mixed in a ratio of 1:1 by volume, however the ratio may range from about 10:1 to about 1:10. During mixing, and after mixing, the A Side components and B Side components react to form a polyurethane adhesive having suitable physical properties. Preferably, the adhesive composition is applied in discrete beads or ribbons overtop the roofing substrate, such as the insulation boards or roof deck or roofing membrane. Next, the roofing membrane is rolled or otherwise positioned overtop of the adhesive composition and the roofing substrate. The adhesive composition then cures and secures the roofing membrane to the roofing substrate. Due to the formulation of the adhesive composition of the present invention, the roofing substrate and the roofing membrane may be untreated, i.e., no primer or membrane fleece back is required to achieve the desired adhesive strength. The multi-bead applicator may also be used to apply the adhesive composition in a one-part configuration.

In a fourth step heat is applied to the newly installed neat EPDM membrane. In the example provided, a heated roller is applied over the neat EPDM to promote the exothermic reaction in cold weather installations. It should be appreciated that other methods of applying heat may be incorporated or the application of heat may be omitted without departing from the scope of the present invention.

The method of adhering a "neat" EPDM roofing membrane to a roof member provides several advantages over existing methods. The present method provides a VOC free application using curable chemistry between two water-impervious membranes. Furthermore, the present method does not require a fleece backing or priming to adhere the EPDM roofing membrane to the roof member.

The description of the invention is merely exemplary in nature and variations that do not depart from the gist of the invention are intended to be within the scope of the inven- The following is claimed:

1. A composite roof structure comprising:
   a roofing substrate having a substrate surface;
   a roofing membrane having a membrane surface that opposes the substrate surface of the roofing substrate; and
   an adhesive layer directly adhering to the substrate surface of the roofing substrate and directly adhering to the membrane surface of the roofing membrane, wherein the adhesive layer includes:
   (i) an A side composition having at least one of a polyurethane prepolymer and a diisocyanate present in an amount from about 70% to about 90% by weight of the A side composition and at least one adhesion promoter in an amount from about 10% to about 30% by weight of the A side composition,
   (ii) a B side composition having a polyol present in an amount from about 93% to about 97% by weight of the B side composition, a catalyst present in amount from about 0.5% to about 5% by weight of the B side composition and a blowing agent in an amount of 0.25% to 3% by weight of the B side, wherein the adhesive layer is the product of mixing a B side composition and an A side composition, wherein the ratio of the isocyanate groups in the A side to the hydroxyl groups on the B side is greater than 1.5:1.

2. The composite roof structure of claim 1 wherein the substrate surface and the membrane surface are untreated.

3. The composite roof structure of claim 1 wherein the roofing substrate is an EPDM sheet of a previously assembled roof.

4. The composite roof structure of claim 3 wherein the roofing membrane is a sheet of EPDM.

5. The composite roof structure of claim 1 wherein the adhesive layer is secured to the roof substrate in discrete spray, ribbons or beads.

6. The composite roof structure of claim 1 wherein the adhesive layer is secured to the roof substrate in full coverage.

7. The composite roof structure of claim 1 wherein the adhesive layer is pumped through a roofing applicator onto the roofing substrate.

8. The composite roof structure of claim 1 wherein the at least one adhesion promoter in the A side composition of the adhesive layer is selected from the group consisting of chlorinated paraffins and chlorinated polyolefins.

9. The composite roof structure of claim 1 wherein the at least one adhesion promoter in the A side composition of the adhesive layer includes at least two adhesion promoters each selected from the group consisting of chlorinated paraffins and chlorinated polyolefins.

10. The composite roof structure of claim 1 wherein the adhesive layer is soft with a modulus of less than 500 psi and is tacky with a T-peel breakaway strength of greater than 0.5 pli.

* * * * *